No. 651,365. Patented June 12, 1900.
G. KLAHRE.
PIPE TRIMMING AND THREADING TOOL.
(Application filed Sept. 27, 1899.)
(No Model.)

Witnesses:
W. C. Corlies
W. H. Cotton.

Inventor:
Gustav Klahre.
By Louis K. Gleeson, Atty.

UNITED STATES PATENT OFFICE.

GUSTAV KLAHRE, OF CHICAGO, ILLINOIS.

PIPE TRIMMING AND THREADING TOOL.

SPECIFICATION forming part of Letters Patent No. 651,365, dated June 12, 1900.

Application filed September 27, 1899. Serial No. 731,783. (No model.)

*To all whom it may concern:*

Be it known that I, GUSTAV KLAHRE, a citizen of the United States of America, and a resident of Chicago, county of Cook, and State of Illinois, have invented certain new and useful Improvements in Pipe Trimming and Threading Tools, of which the following is a specification and which are illustrated in the accompanying drawings, forming a part thereof.

This invention relates to dies for trimming, tapering, and threading the outer ends of pipes; and its object is to provide a tool in which all three of these operations are simultaneously performed and in which the trimming and tapering operations assist in the threading operation.

The invention consists in providing a die with both threading and trimming or planing blades or edges so disposed that as the threads are formed their apexes are trimmed to remove any irregularities in the pipe and give it the desired taper, thereby relieving the threading-blades of the duty of reducing the pipe to the taper form. A tool showing this arrangement of parts is illustrated in the accompanying drawings, in which—

Figure 1:
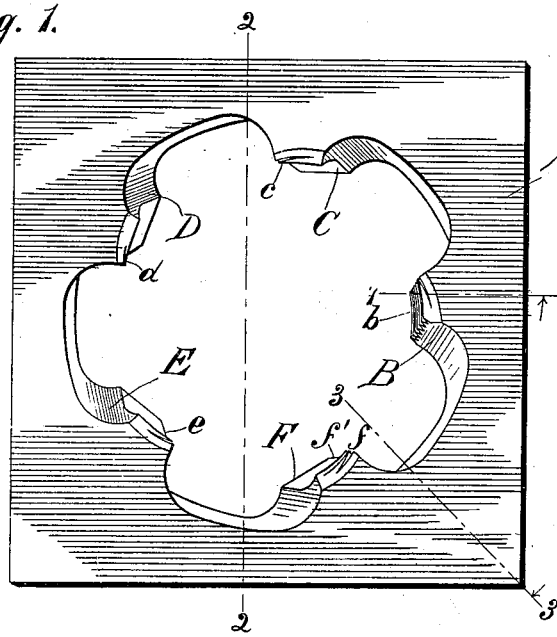
Figure 2:
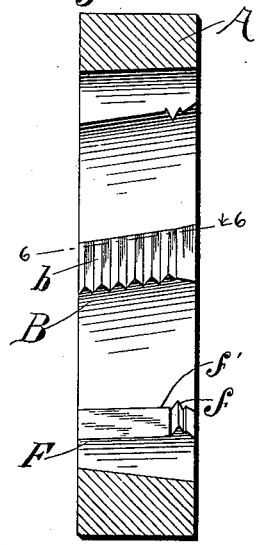
Figure 5:
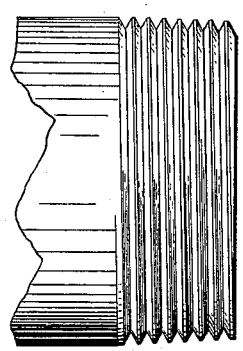
Figure 4:
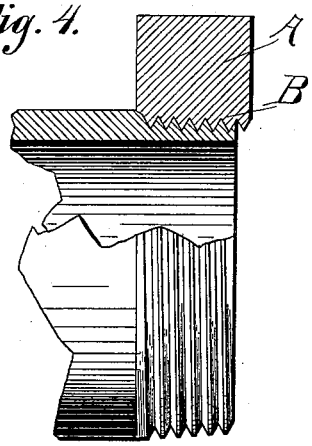
Figure 3:
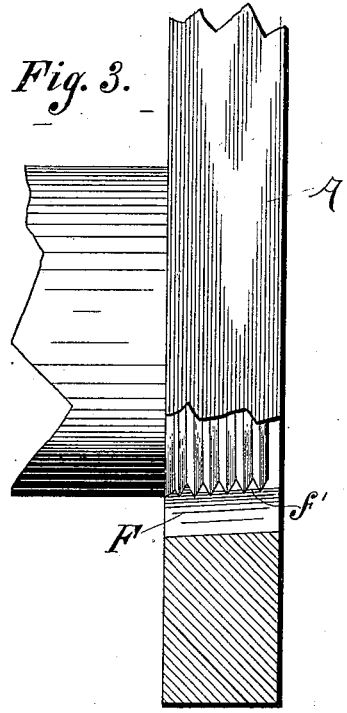
Figure 6:
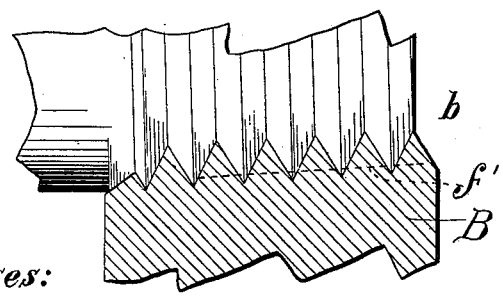

Figure 1 is a front elevation of the die. Fig. 2 is a sectional view on the line 2 2 of Fig. 1. Fig. 3 is a detail section on the line 3 3 of Fig. 1, some of the parts and a portion of the pipe being shown in elevation. Fig. 4 is a detail section on the line 4 4 of Fig. 1, a piece of pipe being shown partly in section and partly in elevation. Fig. 5 is a detail elevation of a piece of pipe with a thread formed thereon, and Fig. 6 is a diagrammatic view on the line 6 6 of Fig. 2 and showing also in dotted lines a similar view through one of the trimming-blades and taken at the same angle.

In the drawings the incline or taper of the die and of the threaded pipe is exaggerated for the purpose of clearness of illustration. The die A consists of a metal block of the usual square form centrally apertured and provided with a plurality of instanding blades, as B, C, D, E, and F, as shown five in number, though the number may be varied, according to the judgment of the maker. One or more of these blades, as B, are provided with threading-teeth $b$, such as are ordinarily formed upon the blades of threading-dies and other of the blades, as C, D, E, and F, while being provided near their forward ends with a single tooth, as $c$, $d$, $e$, and $f$, for the purpose of securing proper feed are otherwise smooth, and each is provided at its advancing face with a planing edge, as $f'$. The radial distance of these planing edges from the axis of the tool is slightly less than that of the bases of the threading-teeth $b$, so that as the threads are formed upon the pipe by the action of the teeth $b$ their apexes are trimmed down by the planing edges. All of the blades are given the usual incline with reference to the axis of the tool, so that as it is advanced upon the pipe the latter is trimmed to a tapering form.

The action of this tool is as follows: It is presupposed that the pipe is in reasonably good form and without serious irregularities upon its surface, as is usual with pipe now upon the market. The first tooth of the threading-blade B and the feeding-teeth of each of the other blades enter the surface of the pipe to their full depth. The planing edges immediately remove the apex of the thread thus formed, so that the next tooth of the threading-blade sinks the thread deeper without being obliged to remove or reduce by compression the apex of the thread already formed. The advancing blades upon the second rotation of the tool trim the second thread in the same manner as they had already trimmed the first and at the same time still further trim down the first thread. As the tool continues to advance this operation is repeated until all the threads have been formed, each succeeding tooth of the threading-blade sinking the threads slightly deeper and at each rotation of the tool the threads being gradually trimmed down, so as to give the pipe the necessary tapering form. By reason of this conjoint action of the threading and planing edges it will be seen that the inequalities and surplus metal of the pipe are removed by the planing edges after having been first grooved by the threading-teeth, so that the trimming action is greatly facilitated and accomplished at the expense of much less labor. It will also be seen that the threads are gradually sunk to the necessary depth and the threading-blade entirely relieved of the duty of removing or compressing the apexes of the partially-formed threads. I have found in practice that this trimming and threading action can be accomplished by means of this tool at the expenditure of far less labor and time than is required in the operation of the old form of threading-die or in the successive operation of separate trimming and threading tools.

While I have shown but one threading-blade and four planing edges, I do not desire to be limited to this proportion, as it is obvious that the relative number of the two styles of blades may be varied, the invention consisting, broadly, in combining in one tool blades provided only with threading-teeth and other blades provided with trimming edges, the several blades being arranged in a circumferential series.

I claim as my invention—

1. A pipe threading and trimming tool comprising an apertured block having instanding blades, some of the blades having threading-teeth and other blades having longitudinally-disposed planing edges, such threading-teeth and planing edges being adapted for simultaneous action.

2. A pipe threading and trimming tool comprising a block having an aperture and blades projecting thereinto, some of the blades having threading-teeth and other blades having longitudinally-disposed planing edges, the radial distance of the planing edges from the axis of the aperture being intermediate of the radial distances of the tops and bases respectively of the threading-teeth.

3. A pipe threading and trimming tool comprising a block having an aperture and blades projecting thereinto, some of the blades having threading-teeth and other blades having longitudinally-disposed planing edges, the radial distance of the planing edges from the axis of the aperture being intermediate of the radial distances of the tops and bases respectively of the threading-teeth, the several blades being uniformly oblique to the axis.

GUSTAV KLAHRE.

Witnesses:
PAUL CARPENTER,
E. M. KLATCHER.